Patented Mar. 11, 1952

2,588,425

UNITED STATES PATENT OFFICE 2,588,425

PREPARATION OF TETRA-ISOBUTYLENE

Donald R. Stevens, Wilkinsburg, and Robert S. Bowman, Pittsburgh, Pa., assignors to Gulf Research & Development Company, Pittsburgh, Pa., a corporation of Delaware No Drawing. Application December 4, 1947, Serial No. 789,744

10 Claims. (Cl. 260—683.15)

This invention relates to an improved process for the preparation of tetra-isobutylene, and in particular concerns a process whereby di-isobutylene is polymerized to form tetra-isobutylene in high yield with minimum formation of other isobutylene polymers.

It is well known that under the influence of certain catalysts isobutylene undergoes polymerization to form products ranging in molecular weight from that of the dimer to values as high as 50,000 or more. It is also known that by selection of the proper catalyst and the proper reaction temperature the polymerization reaction may be so influenced as to produce a polymeric product which for the most part comprises polymers of relatively low molecular weight, e. g., ranging from that of the dimer to that of the decamer. Among such low molecular weight polymers, the tetramer is possessed of physical and chemical properties which render it of particular value in the manufacture of motor fuels, being employed either as such or in hydrogenated form and either alone or suitably blended with other combustible materials. It may also be employed in the manufacture of hydraulic oils, special solvents, detergents, plasticizing agents, etc., and as a chemical intermediate. Accordingly, a number of attempts have been made to carry out the polymerization of isobutylene or di-isobutylene so as to produce a high yield of tetra-isobutylene with minimum formation of other polymers, and while several processes for accomplishing this end have been proposed, they are not entirely satisfactory from the standpoint of large scale operation. Certain of these processes require the use of catalysts which are expensive or difficult to handle, or both. Others require very careful control of reaction conditions, or are characterized by a low per-pass conversion to the desired product, thus requiring extensive recycling of unconverted starting material.

It is accordingly an object of the present invention to provide an improved process for the preparation of tetra-isobutylene.

Another object is to provide a process for the preparation of tetra-isobutylene in high yields without recycling of unconverted starting material.

A further object is to provide a process for the preparation of tetra-isobutylene which is adapted to large scale operation.

Other objects will be apparent from the following detailed description of the invention, and various advantages not specifically referred to herein will occur to those skilled in the art upon employment of the invention in practice.

We have found that the above and related objects may be realized in a process whereby di-isobutylene is contacted with a boron trifluoride-ether complex at a temperature between about 0° C. and about 55° C. Under such conditions the di-isobutylene polymerizes to form a product consisting almost exclusively of tetra-isobutylene. The polymerization reaction proceeds smoothly, and practically complete conversion of the di-isobutylene is attained. Inasmuch as the reactant, catalyst, and product are all present in the liquid state, the reaction is easily controlled and the process is readily adapted to continuous, semi-continuous, or batch-wise operation under atmospheric, superatmospheric, or reduced pressure, as may be convenient or desired. The catalyst is very stable and is easily handled. The tetra-isobutylene product obtained is usually of very narrow boiling range, indicating that it probably comprises only relatively few of the several possible tetra-isobutylene isomers.

The process of the invention is conveniently carried out simply by agitating a mixture of di-isobutylene and the catalyst maintained at the desired reaction temperature until reaction is complete. The reaction takes place readily with the evolution of heat, and consequently it is usually convenient to carry out the reaction in the presence of a solvent or diluent to assist in the dissipation of heat as well as to promote intimate and uniform contact between the di-isobutylene and the catalyst. Such solvent must be inert as far as the reaction is concerned, i. e., it must not react with any of the reaction components at the temperatures employed. Suitable inert reaction solvents are in general non-polar organic liquids such as paraffin hydrocarbons, e. g., pentane, hexane, octane, etc., aromatic hydrocarbons, e. g., benzene, toluene, ethylbenzene, etc.; and halogenated paraffin and aromatic hydrocarbons, e. g., methylene chloride, ethylene dibromide, chlorobenzene, etc. The use of such inert reaction solvents is not essential to succcessful practice of the invention, however, since temperature control and removal of the heat evolved may be effected in other ways, e. g., by employing a reaction vessel fitted with cooling coils or by circulating the reaction mixture through a suitable heat exchanger. In cases where the boron trifluoride-etherate catalyst is insoluble in the reaction mixture, the use of an inert reaction solvent is indicated in order to secure good contact between the reactant and the catalyst and to realize the advantages of liquid-phase operation.

The di-isobutylene reactant may be obtained from any convenient source, as for example by the selective polymerization of isobutylene employing a sulfuric acid catalyst in accordance with the process disclosed in U. S. Patent No. 2,258,368. It is preferably employed in relatively pure form and free from isobutylene which reacts under the conditions of the reaction to form tri-isobutylene.

Any of the boron trifluoride-ether complexes may be employed as the catalyst in accordance with the invention, although the diethyl ether complex is usually preferred by reason of its low cost and commercial availability. If desired, however, the complexes of boron trifluoride with other dialkyl ethers such as dimethyl ether, di-isopropyl ether, di-n-butyl ether, di-isoamyl ether, di-dodecyl ether, di-octodecyl ether, ethyl isopropyl ether, methyl amyl ether, n-propyl octyl ether, etc.; cycloalkyl ethers, such as di-cyclohexyl ether, ethyl cycloheptyl ether, etc.; cyclic ethers, such as dioxane, tetrahydrofurane, pentamethylene oxide, etc.; alkyl aryl ethers, such as methyl phenyl ether, hydroquinone diethyl ether, etc.; and aryl-substituted alkyl ethers, such as di-benzyl ether, benzyl phenylethyl ether, benzyl ethyl ether, etc., may be employed. Any of such ether complexes may be prepared simply by passing gaseous boron trifluoride into the ether at ordinary temperatures until the desired increase in weight is attained. Usually the complex will contain the boron trifluoride and ether in equimolecular proportions, although complexes of fractional or multi-molecular proportions may be employed. The amount of catalyst employed may be varied between wide limits, but in the interests of economy is usually kept as low as is consistent with optimum yield of the desired product. Ordinarily, between about 0.02 and about 0.20 moles of the catalyst are employed per mole of di-isobutylene.

It has been found that at temperatures below about 0° C., the reaction takes place slowly with incomplete conversion of the di-isobutylene and with the formation of polymers higher than the tetramer. On the other hand, at temperatures above about 55° C. substantial amounts of the trimer are formed. Accordingly the reaction is carried out at temperatures between about 0° C. and about 55° C., and preferably between about 10° C. and about 50° C. The time required for completion of the reaction depends upon a number of factors, including the reaction temperature, the particular catalyst employed and the amount in which it is present, and the degree of agitation of the reaction mixture. Ordinarily, however, the reaction is complete in from about 0.5 to 2.5 hours.

The tetra-isobutylene product may be separated from the catalyst and any unreacted di-isobutylene and/or polymeric by-products by any convenient means, e. g., by fractional distillation, solvent extraction, azeotropic distillation, etc. Such separation is advantageously carried out shortly after the reaction is completed since the tetra-isobutylene product tends to de-polymerize if allowed to stand in contact with the catalyst over extended periods of time. When an especially pure product is desired, it is preferable to remove the catalyst by washing the reaction product with a dilute alkali and water, and thereafter fractionally distilling the washed product to isolate the tetra-isobutylene.

The following examples will illustrate several ways in which the principle of the invention has been applied, but are not to be construed as limiting the same. All proportions are given as parts by weight.

*Example I*

Approximately 112 parts of di-isobutylene and 6.0 parts of the equimolecular complex of boron tri-fluoride and diethyl ether were dissolved in 56.5 parts of chlorobenzene. This mixture was vigorously stirred for a period of 1 hour during which time the temperature was maintained at about 25° C. The mixture was then washed once with dilute aqueous sodium hydroxide and several times with water. After drying over sodium sulfate, the washed product in the amount of 164 parts by weight was fractionally distilled. The following fractions were obtained:

| Fraction No. | Weight | Boiling Point ° C. | Identity |
|---|---|---|---|
| 1 | 8 | 99–130/760 mm | |
| 2 | 50 | 130/760 mm | Chlorobenzene. |
| 3 | 8 | 130/760 mm.–122/20 mm | |
| 4 | 92 | 122–125.5/20 mm | Tetraisobutylene. |
| 5 | 6 | | Still hold-up. |

The distillation showed no evidence of tri-isobutylene having been formed. The overall yield of tetra-isobutylene was about 82 per cent of the theoretical.

*Example II*

Approximately 18 parts of the equimolecular complex of boron trifluoride and diethyl ether was added dropwise over a period of 15 minutes to 336 parts of di-isobutylene at a temperature of 25° C. The mixture was then agitated for one hour while maintaining the temperature at 25° C. The product was washed with dilute alkali and water, and after drying was fractionally distilled. There was obtained 45 parts of unreacted di-isobutylene, no substantial amount of tri-isobutylene, 273 parts of tetra-isobutylene distilling at 124°–125° C./20 mm., and no substantial amount of higher polymers. The yield of tetra-isobutylene, based on the amount of di-isobutylene converted, was about 93.8 per cent of the theoretical.

*Example III*

The process described above in Example II was carried out at a temperature of about 40° C., agitating the reaction mixture for 1½ hours employing 224 parts of di-isobutylene and 12 parts of the catalyst. There was obtained 185 parts of unreacted di-isobutylene, substantially no tri-isobutylene, and 196 parts of tetra-isobutylene, corresponding to a yield of tetra-isobutylene of about 95 per cent of theoretical, based on the amount of di-isobutylene converted.

*Example IV*

Example III was repeated, employing the same quantities of di-isobutylene and catalyst but employing a reaction temperature of about 60°–65° C. There was obtained 12.5 parts of unreacted di-isobutylene, 83 parts of tri-isobutylene, 99 parts of tetra-isobutylene, and 10 parts of higher polymers. The overall yield of tetra-isobutylene was only about 44 per cent of theoretical.

Other modes of applying the principle of our invention may be employed instead of those explained, change being made as regards the method herein disclosed provided the step or steps stated by any of the following claims, or the equivalent of such stated step or steps, be employed.

We, therefore, particularly point out and distinctly claim as our invention:

1. The process for preparing tetra-isobutylene which comprises contacting di-isobutylene with a boron trifluoride-ether complex at a temperature between about 0° C. and about 55° C.

2. The process for preparing tetra-isobutylene which comprises contacting di-isobutylene with a boron trifluoride-ether complex at a temperature between about 10° C. and 50° C.

3. The process for preparing tetra-isobutylene which comprises contacting di-isobutylene with a boron trifluoride-ether complex at a temperature between about 10° C. and 50° C. in the presence of an inert reaction solvent.

4. The process for preparing tetra-isobutylene which comprises contacting di-isobutylene with a complex of boron-trifluoride and a dialkyl ether at a temperature between about 0° C. and about 55° C.

5. The process for preparing tetra-isobutylene which comprises contacting di-isobutylene with a complex of boron trifluoride and diethyl ether at a temperature between about 0° C. and about 55° C.

6. The process for preparing tetra-isobutylene which comprises contacting di-isobutylene with a complex of boron trifluoride and diethyl ether at a temperature between about 10° C. and 50° C.

7. The process for preparing tetra-isobutylene which comprises contacting di-isobutylene with a complex of boron trifluoride and diethyl ether at a temperature between about 0° C. and 55° C. in the presence of an inert reaction solvent.

8. The process for preparing tetra-isobutylene which comprises contacting di-isobutylene with a complex of boron trifluoride and diethyl ether at a temperature between about 10° C. and 50° C. in the presence of an inert reaction solvent.

9. In a process for preparing tetra-isobutylene, the steps which comprise agitating a mixture of di-isobutylene and a complex of boron trifluoride and diethyl ether for from about 0.5 to about 2.5 hours while maintaining a temperature between about 0° C. and about 55° C., washing said mixture with an aqueous alkali and water, and fractionally distilling the washed product to recover tetra-isobutylene.

10. In a process for preparing tetra-isobutylene, the steps which comprise agitating a mixture of di-isobutylene and the equimolecular complex of boron trifluoride and diethyl ether dissolved in chlorobenzene, the amount of said complex being between about 0.02 and about 0.2 moles per mole of diisobutylene, for from about 0.5 to about 2.5 hours while maintaining a temperature between about 10° C. and about 50° C., washing said mixture with dilute aqueous sodium hydroxide and water, and fractionally distilling the washed product to separate tetra-isobutylene.

DONALD R. STEVENS.
ROBERT S. BOWMAN.

REFERENCES CITED

The following references are of record in the file of this patent:

UNITED STATES PATENTS

| Number | Name | Date |
|---|---|---|
| 2,270,052 | Hattox | Jan. 13, 1942 |
| 2,379,656 | Ruthruff | July 3, 1945 |

FOREIGN PATENTS

| Number | Country | Date |
|---|---|---|
| 801,883 | France | Aug. 20, 1936 |
| 804,591 | France | Oct. 27, 1936 |

OTHER REFERENCES

Chem. Abstracts, vol. 41, No. 12, page 3946 (June 20, 1947), citing Topchiev et al., Neftyanoe Khoz. 24, No. 11, 45–50 (1946).